United States Patent
Shikano et al.

(10) Patent No.: US 11,106,680 B2
(45) Date of Patent: Aug. 31, 2021

(54) SYSTEM, METHOD OF REAL-TIME PROCESSING UNDER RESOURCE CONSTRAINT AT EDGE

(71) Applicant: HITACHI, LTD., Tokyo (JP)

(72) Inventors: Hiroaki Shikano, Kanagawa (JP); Yukinori Sakashita, Mountain View, CA (US)

(73) Assignee: HITACHI, LTD., Tokyo (JP)

( * ) Notice: Subject to any disclaimer, the term of this patent is extended or adjusted under 35 U.S.C. 154(b) by 420 days.

(21) Appl. No.: 16/081,844

(22) PCT Filed: Nov. 8, 2016

(86) PCT No.: PCT/US2016/060934
§ 371 (c)(1),
(2) Date: Aug. 31, 2018

(87) PCT Pub. No.: WO2018/088992
PCT Pub. Date: May 17, 2018

(65) Prior Publication Data
US 2019/0065555 A1  Feb. 28, 2019

(51) Int. Cl.
| | |
|---|---|
| G06F 16/2455 | (2019.01) |
| G06F 9/50 | (2006.01) |
| H04W 4/38 | (2018.01) |
| G06F 16/2458 | (2019.01) |
| H04L 29/08 | (2006.01) |
| G06F 16/2453 | (2019.01) |

(52) U.S. Cl.
CPC ...... *G06F 16/24568* (2019.01); *G06F 9/5011* (2013.01); *G06F 16/2477* (2019.01); *H04L 67/125* (2013.01); *H04W 4/38* (2018.02)

(58) Field of Classification Search
None
See application file for complete search history.

(56) References Cited

U.S. PATENT DOCUMENTS

| | | | |
|---|---|---|---|
| 10,152,357 B1* | 12/2018 | Espy | G06F 9/5005 |
| 2010/0106710 A1* | 4/2010 | Nishizawa | G06F 16/24556 707/714 |
| 2010/0145929 A1 | 6/2010 | Burger et al. | |
| 2011/0252166 A1* | 10/2011 | Padala | G06F 3/061 710/74 |
| 2012/0166421 A1* | 6/2012 | Cammert | G06F 16/24575 707/718 |
| 2014/0074982 A1 | 3/2014 | Misra et al. | |
| 2015/0286684 A1* | 10/2015 | Heinz | G06F 16/9024 707/769 |
| 2016/0300157 A1* | 10/2016 | Sankaradas | G06F 16/252 |

* cited by examiner

*Primary Examiner* — Usmaan Saeed
*Assistant Examiner* — Yu Zhao
(74) *Attorney, Agent, or Firm* — Procopio, Cory, Hargreaves & Savitch LLP

(57) ABSTRACT

Example implementations described herein are directed to systems and methods for managing a relationship between real-time analysis processes and applications, where each of the applications are configured to utilize output from one or more of the corresponding real-time analysis processes. In an example implementation, resource adjustment is applied to the real-time analysis process based on a determined priority.

11 Claims, 13 Drawing Sheets

| CQL | Window Size | Resolution | Required memory |
|---|---|---|---|
| RTQ 1 | 10 min | 0.2 sec | 300 MB |
| RTQ 2 | 1 min | 0.1 sec | 300 MB |
| RTQ 3 | 10 sec | 0.1 sec | 300 MB |

Real-time Analytics Process Resource Information

FIG. 6

Sensor Information Table

Real-time Analytics Output Information Table

Resource Adjustment Flow For Real-time Analytics Process

SYSTEM, METHOD OF REAL-TIME PROCESSING UNDER RESOURCE CONSTRAINT AT EDGE

BACKGROUND

Field

The present disclosure relates to real-time processing, and more specifically, to a method and apparatus for real-time processing under resources constraints at the edge of a system.

Related Art

Analytics is now becoming one of the important applications for business and social infrastructure such as business intelligence, customer marketing, efficient system operations, value-added services, etc. Today such analytics applications are processed mainly at servers in data centers or a cloud (herein defined as "core").

At the same time, more and more devices such as such as sensors, phones, tablets, televisions, etc. are connected to a network, and their data is being gathered into the core for value added services. This is also known as Internet of Things (IoT). For example, many sensors such as cameras are now being placed everywhere at home, office, factory, public space, etc., and being analyzed. Currently such data is analyzed at the core and some feedback is given to users. Users recognize analytics results and judge operations of equipment or machinery. But such feedback will be given not only to users, but also equipment or machinery directly for faster decision and more efficient operations.

However, as the number of such connected devices increases, there may be difficulty in gathering all the information from such devices to the core due to limited bandwidth of the network or limited resources e.g. computation, memory, storage at the core. Also, the lack of real-timeness and reliability are also issues caused by the time taken for transferring data from sensors to the core and responding from the core or an unstable network connection. The data is transferred through a best-effort wireless network such as WiFi, Third Generation/Long Term Evolution (3G/LTE) and Internet shared by other communications.

Such connected devices (herein defined as "edge devices") have become smart devices with some computation resources embedded and with multiple sensors connected. Many such devices are also connected to access points of a network e.g. WiFi or set top boxes of communication services. Such access points or set top boxes are herein defined as "gateways". Gateways now have computation resources, and their functions are being virtualized and some are incorporated into cloud.

Eventually, distributed processing with collaboration of the edges and the core is becoming main stream for large-scale IoT systems with a number of connected sensors. Such distributed processing implementations facilitate scalability, reliability, service continuity and real-timeness. There is a difference between available resources between at edge and at core. Edge devices may have a limitation on computation resources such as a central processing unit (CPU) performance, memory size and storage size, and other constraints as well such as batteries, footprint, environment (indoor or outdoor), etc. Therefore, the edges mainly target streaming data processing for data coming from sensors or real-time processing to reduce amount of such data transferred into the core, and core processing targets historical analytics for long-term data stored at the core.

SUMMARY

Aspects of the present disclosure can include a computer system configured to manage a relationship between multiple real-time analysis processes and multiple applications. Each of the applications are configured to utilize output from one or more of the corresponding real-time analysis processes. The computer system may include a processor. The processor may be configured to determine a priority for each of the real-time analysis processes based the relationship in the memory, select a real-time analysis process for resource adjustment based on the priority; and apply the resource adjustment to the selected real time analysis process.

Aspects of the present disclosure further include a non-transitory computer readable medium storing instructions for managing a relationship between multiple real-time analysis processes and multiple applications. Each of the applications are configured to utilize output from one or more of the corresponding real-time analysis processes. The instructions may include determining a priority for each of the real-time analysis processes based the relationship in a memory, selecting a real-time analysis process from the real-time analysis processes for resource adjustment based on the priority, and applying the resource adjustment to the selected real-time analysis process.

Aspects of the present disclosure can further include a method, which can include managing a relationship between multiple real-time analysis processes and multiple applications. Each of the applications are configured to utilize output from one or more of the corresponding real-time analysis processes. The method may include determining a priority for each of the real-time analysis processes based the relationship in a memory, selecting a real-time analysis process from the real-time analysis processes for resource adjustment based on the priority, and applying the resource adjustment to the selected real-time analysis process.

Aspects of the present disclosure further include an apparatus for managing a relationship between multiple real-time analysis processes and multiple applications. Each of the applications can include means for utilizing output from one or more of the corresponding real-time analysis processes. The apparatus can include means for determining a priority for each of the real-time analysis processes based the relationship in a memory, means for selecting a real-time analysis process from the real-time analysis processes for resource adjustment based on the priority, and means for applying the resource adjustment to the selected real-time analysis process.

BRIEF DESCRIPTION OF DRAWINGS

FIG. 6 illustrates a real-time analytics process resource information table, in accordance with an example implementation.

DETAILED DESCRIPTION

Figure 1:
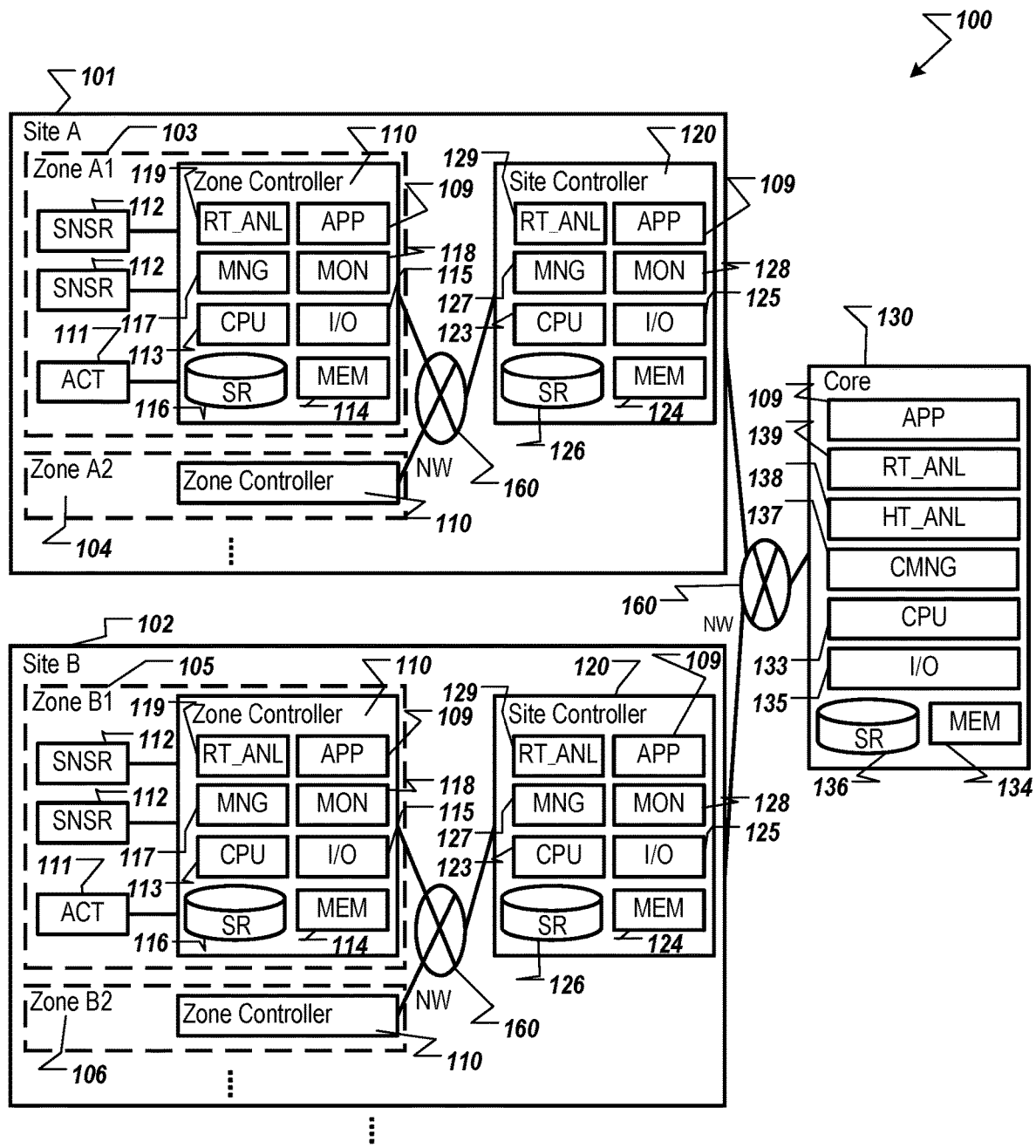
FIG. 1 illustrates an example architecture of a distributed environment in which the method and apparatus of the example implementations described herein may be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example architecture of a distributed environment for distributed IoT systems. This example illustrates an edge-core analytics system 100 for a manufacturer owning multiple factories (e.g., Site A 101, Site B 102). Each factory is assumed to have multiple zones (e.g., Zone A1 103, Zone A2 104, Zone B1 105, Zone B2 106) where process lines exist. A zone controller 110 is placed in every zone (103, 104, 105, 106), and it is connected with sensors 112 and actuators 111, and to upper site controller 120. Zone controller can include CPU 113, memory (MEM) 114, I/O interface (I/O) 115 and storage (SR) 116. Real-time analytics (RT_ANL) 119 runs on the zone controller 110 for data from sensors (SNSR) 112 and output of RT_ANL 119 is sent to the upper site controller 120 or actuator (ACT) 111 for feedback. Management (MNG) 117 is a software component which manages real-time analytics processes and their resources. MNG 117 also manage connecting sensors 112 and actuators 111 i.e. authentication. Monitoring (MON) 118 is a software component which monitors input data throughput from sensors 112 to real-time analytics 119, and output data throughput from real-time analytics 119 to upper site controller 120.

Site controller 120 has the same components as zone controller 110, however the site controller 120 is connected with multiple zone controllers 110 through network (NW) 160. Site controller 120 has capability of real-time analytics 129. For example, site controller 120 analyzes the correlation of a sensor 112 in one zone (e.g., Zone A1 103) and a sensor 112 in another zone (e.g., Zone A2 104). Management (MNG) 127 manages real-time analytics processes as well as connection of zone controllers 110 to a site controller 120.

Site controller 120 is connected to the core 130. The core 130 also has computation resources i.e. CPU 133, I/O 135, MEM 134, and SR 136. Since the core 130 has more resources than the edge, the core may more complicated analysis using more data ingested from sensors 112 and zone controllers 110/site controllers 120 in multiple sites (e.g., Site A 101, Site B 102). Such analysis includes historical analysis, predictive analysis, and machine learning to find or predict a trend in the data and find a data pattern related to a phenomenon or an event. Those analyses can be incorporated into business intelligence to help executives and managers make more informed decisions. In addition, the result of the analyses on the core 130 is used to create new rules for real-time analysis at edges. For example, in the core analysis, a threshold value can be found for a sensor when an abnormality occurs. This thresholding rule is created on the core 130 and distributed to the edges (i.e. zone controller 110 starting a new real-time analysis for detecting abnormality for those sensors 112 at the edge in a real-time manner).

Applications (APP) 109 that consume the processing results of real-time analytics (RT_ANL) 119 can run either on a zone controller 110, a site controller 120 or the core 130. The placement of APP 109 depends on nature of applications. For example, applications may need to respond to local devices (i.e. actuators (ACT) 111 connected to site controllers 120) in low latency, and APP 109 can run on a zone controller 110. If APP 109 analyzes multiple sensor 112 data from multiple sites (e.g., Site A 101, Site B 102) and still needs to respond quickly, APP 109 should run on site controller 120. If APP 109 utilizes historical data and more complex analytics 139 such as machine learning, APP 109 should run on the core 130.

In this way, new real-time analyses 119 can be dynamically added into the edges, and multiple number of real-time analytics processes run at the edges. However, due to the resource limitation of the edges, there is a possibility of having insufficient computation resources at the edges. Streaming data processing used for real-time analysis stores certain period of data in memory, therefore memory shortage is an issue when multiple real-time analytics processes are assigned. The example implementations disclosed herein is to provide a management method of the resources i.e. memory at a device when multiple real-time analytics processes are executed.

Figure 2:
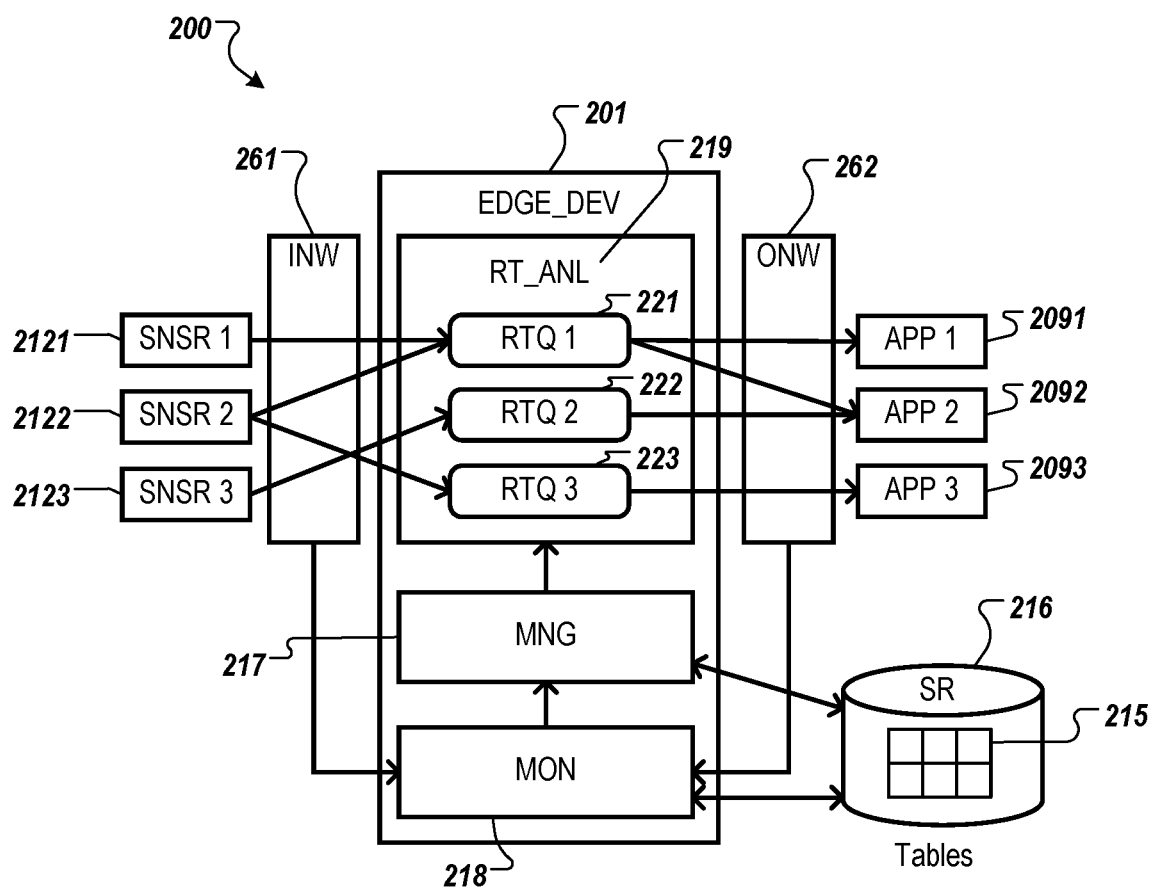
FIG. 2 illustrates an edge device in accordance with an example implementation.

FIG. 2 illustrates an edge device 200 in accordance with an example implementation. Specifically, the edge device 201 illustrates a real-time analytics (RT_ANL) 219 being performed. For example, EDGE_DEV 201 has components of RT_ANL 219, a manager (MNG) 217 for managing real-time analytics processes (RTQ1 221, RTQ2 222, RTQ3 223), and a monitor (MON) 218 for measuring and monitoring bandwidth usage for input network (INW) 261 offering connection from sensors (e.g., SNSR1 2121, SNSR2 2122, SNSR3 2123) to RT_ANL 219, and output network (ONW) 262 offering connection from RT_ANL 219 to applications (e.g., APP1 2091, APP2 2092, APP3, 2093,) which uses the result of RT_ANL 219. The manager MNG 217 reads necessary information defined as tables 215 stored in the storage (SR) 216 for resource management of RT_ANL 219. The monitor MON 218 writes and updates throughput information in a table stored in SR 216.

As illustrated in FIG. 2, the edge device 200 (e.g., zone controller 110, site controller 120) can be configured to manage a relationship between multiple real-time analysis processes RTQ1 221, RTQ2 222, RTQ3 223 and multiple applications APP1 2091, APP2 2092, APP3 2093. Each of the multiple applications APP1 2091, APP2 2092, APP3 2093 are configured to utilize output from one or more of the corresponding multiple real-time analysis processes RTQ1 221, RTQ2 222, RTQ3 223.

The edge device 200 includes the manager MNG 217 and the monitor MON 218, that when executed by a processor, causes the processor to be configured to determine a priority for each of the real-time analysis processes RTQ1 221, RTQ2 222, RTQ3 223 based on the relationship defined in tables 215, as described, for example, in the tables in FIGS. 4-8. In an implementation, the processor executing the MNG 217 can determine one or more applications associated with the target real-time analytics process based on the relationship in the storage 216, as described, for example, in the table in FIG. 5. For example, relationship in the storage 216 can specify a relationship between each of the applications APP1 2091, APP2 2092, APP3 2093, an application priority and one or more output port numbers for ONW 262, as described, for example, in the table in FIG. 5.

Figure 3:
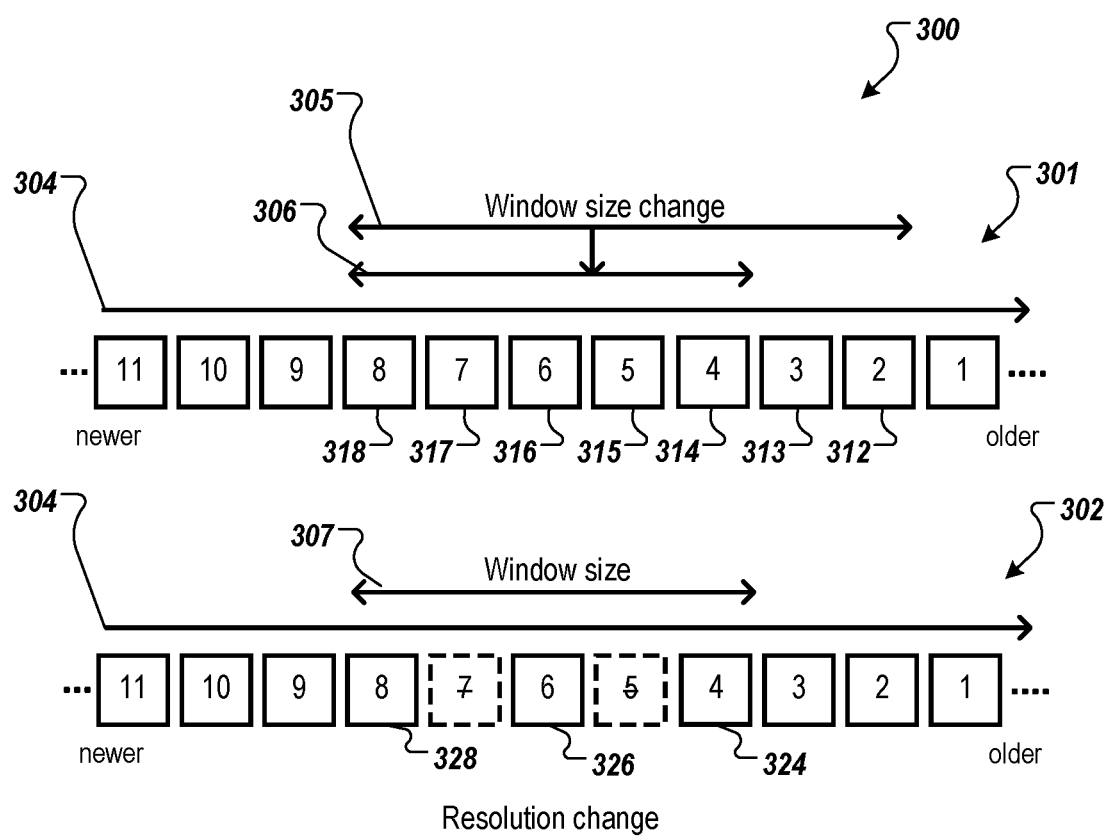
FIG. 3 illustrates an example method for adjusting memory in stream data processing, in accordance with an example implementation.
Figure 10:
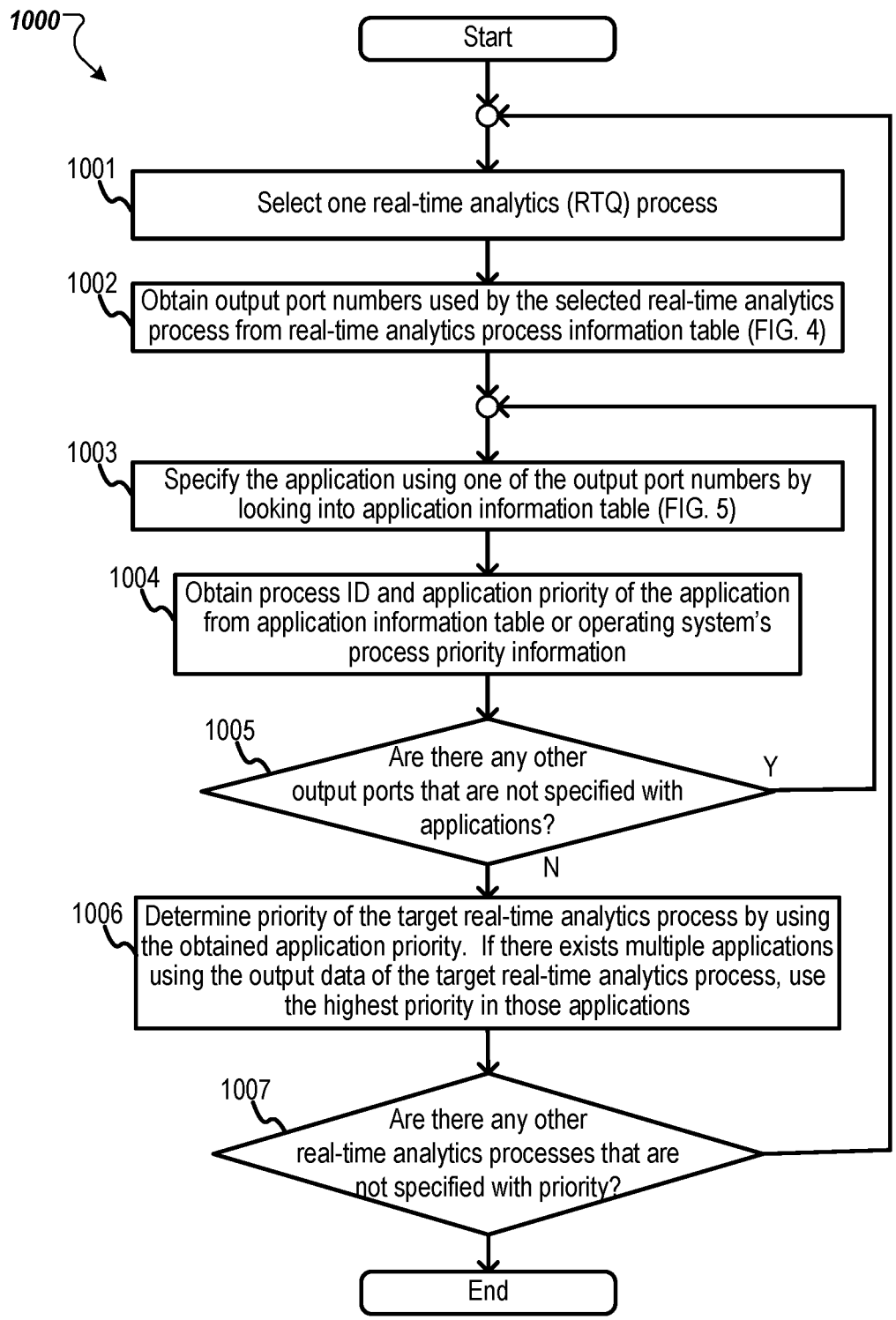
FIG. 10 illustrates a flow for priority determination of real-time analytics processes, in accordance with an example implementation.
Figure 11:
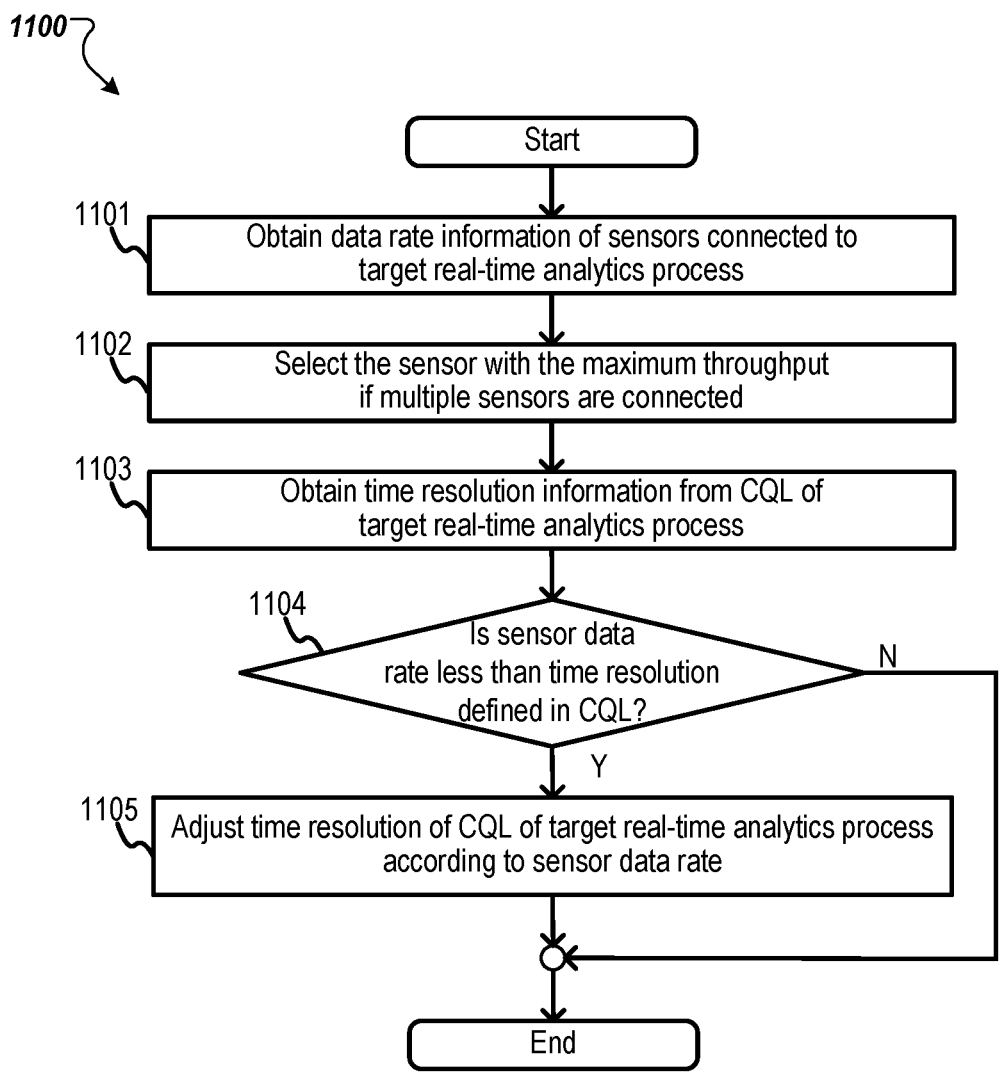
FIG. 11 illustrates a flow of memory adjustment, in accordance with an example implementation.
Figure 12:
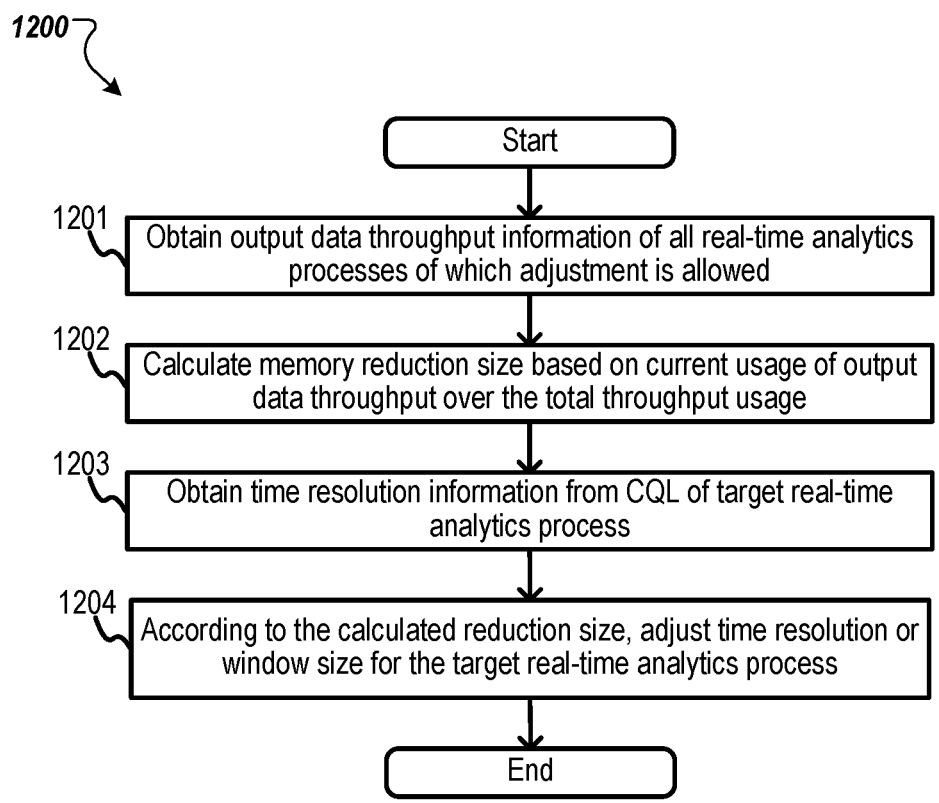
FIG. 12 illustrates a flow of memory adjustment, in accordance with another example implementation.
Figure 13:
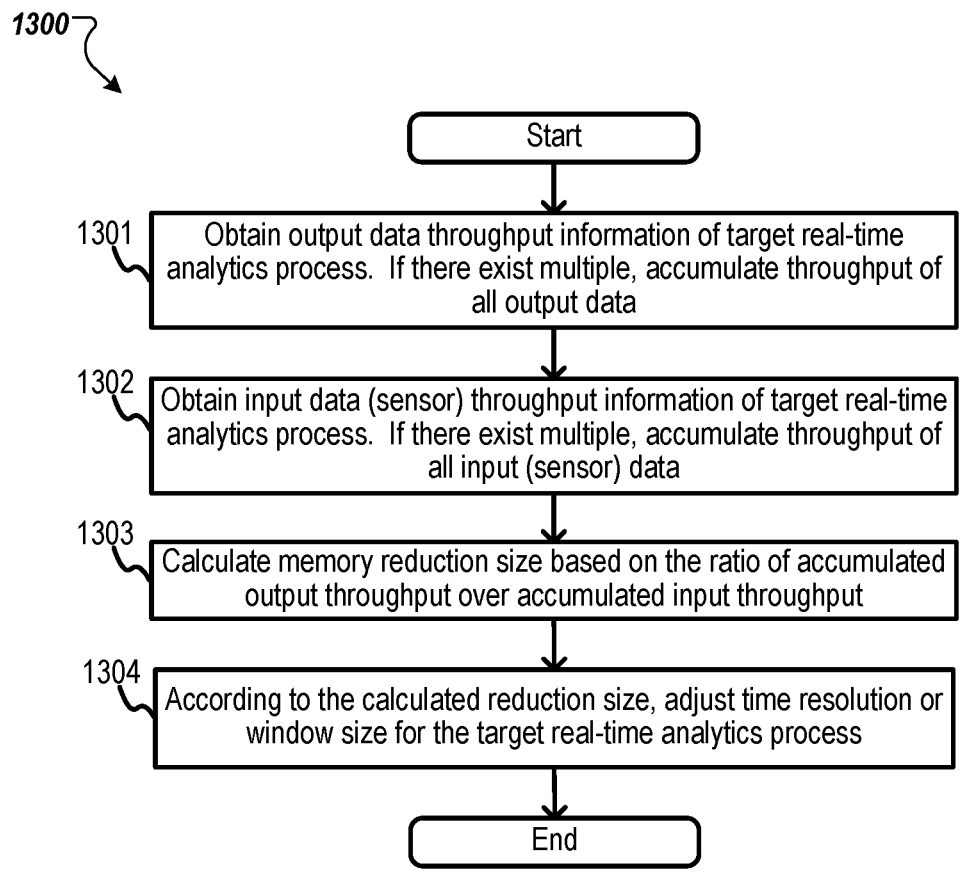
FIG. 13 illustrates a flowchart of memory adjustment, in accordance with another example implementation.

The processor can also select a real-time analysis process (e.g., RTQ2 222) from the multiple real-time analysis processes for resource adjustment based on the priority, as described, for example, in the methods of FIG. 3 and flows of FIGS. 11-13. In an implementation, execution of the MNG 217 can obtain one or more output port numbers for ONW 262 associated with a target real-time analytics process (e.g., RTQ2 222) from a table of the tables 215, as described, for example, in the table in FIG. 4, and determine the priority of the target real-time analytics process (e.g., RTQ2 222) based on the highest priority of the one or more applications (APP2 2092) associated with the target real-time analytics process. The execution of the MNG 217 with RT_ANL 219 applies the resource adjustment to the selected real-time analysis process, as described, for example, in the flows of FIGS. 9-13.

FIG. 3 illustrates an example method 300 for adjusting memory in stream data processing in accordance with an example implementation. Specifically, streaming data processing 300 may manage resources i.e. memory for the processing. Data comes to the processing sequentially from sensors. Stream data processing 304 stores a certain period of data in a "window" 305 and conducts calculation on that data (e.g, data 312-318). In an implementation, changing the window size 306 is a method 301 to adjust memory (e.g., data 314-318). In another implementation, method 302 changes the time resolution of data or sampling. For example, sensor data 304 arrives every second, by only taking data every other second (e.g., data 326, data 328), time resolution is doubled and memory size is reduced.

Figure 4:
FIG. 4 illustrates a real-time analytics process information table, in accordance with an example implementation.

FIG. 4 illustrates a real-time analytics process information table 400, in accordance with an example implementation. Specifically, column 401 illustrates real-time analytics processes, column 402 illustrates input port numbers, column 403 illustrates output port numbers, and column 404 illustrates a flag to indicate whether resource adjustments are allowed. The real-time analytics process information table 400 has information of the input port number 402 used for the connection from the sensors used by the real-time analytics process identified in column 401, output port number identified in column 403 used for the connection to the applications used by the process identified in column 401 and a flag identified in column 404 showing permission of memory adjustment. In an example, real-time analytics process RTQ1 uses sensors connected to input port number 1000 and 1001 and outputs to applications using output port numbers 2000 and 2001.

Figure 5:
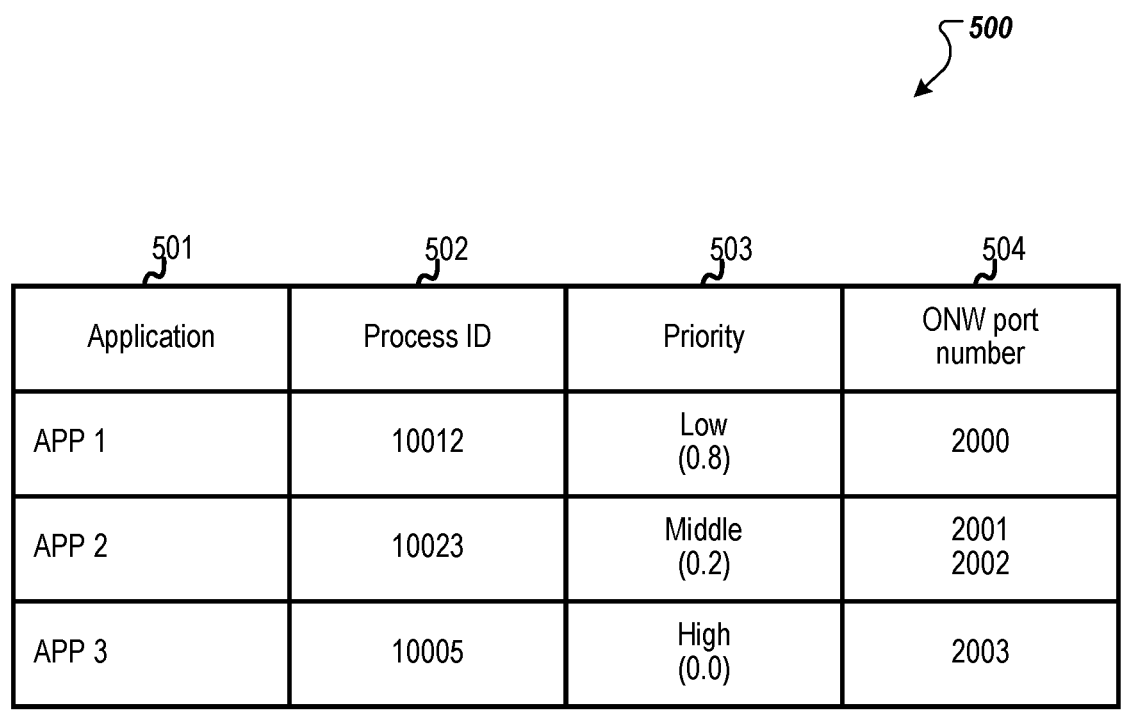
FIG. 5 illustrates an application information table, in accordance with an example implementation.

FIG. 5 illustrates an application information table 500, in accordance with an example implementation. Specifically, the application information table 500 describes information of process identifier (ID) in column 502 of each application indicated in column 501. Column 503 illustrates application priority used for priority management in an operating system. Column 504 illustrates output port number used for the connection from real-time analytics process used by application indicated in column 501. For example, application APP1 has a process ID of 10012, is assigned a Low priority, and connects to real-time analytics processes via output port number 2000.

FIG. 6 illustrates a real-time analytics process resource information table 600, in accordance with an example implementation. Specifically, column 601 illustrates a CQL (continuous query language) CQL (continuous query language). Column 602 illustrates a window size. Column 603 illustrates resolutions. The window size and time resolution are defined for the real-time analytics program illustrated in column 601. Column 604 illustrates required memory size when adjustment is not applied. For example, RTQ1 is configured to have a window size of 10 minutes, a time resolution of 0.2 seconds, and requires 300 megabytes of memory be allocated.

Figure 7:
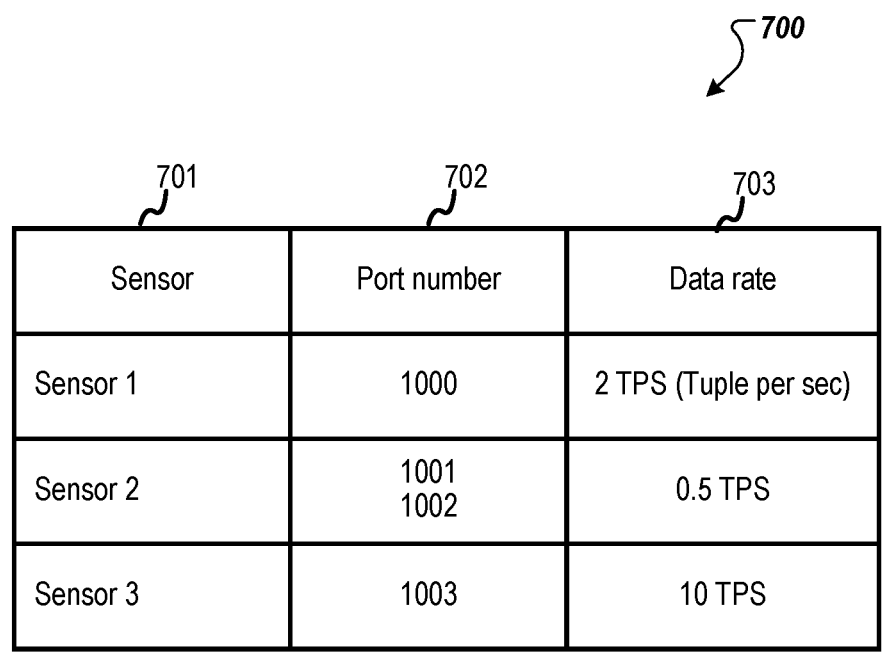
FIG. 7 illustrates a sensor information table, in accordance with an example implementation.

FIG. 7 illustrates a sensor information table 700, in accordance with an example implementation. Specifically, column 701 illustrates sensors identifiers. Column 702 illustrates port numbers used by each sensor identified in column 701 for sending data. A corresponding rate of data generation is illustrated in column 703. For example, Sensor 1 uses input port number 1000 to send data at a data rate of 2 tuples per second (TPS).

Figure 8:
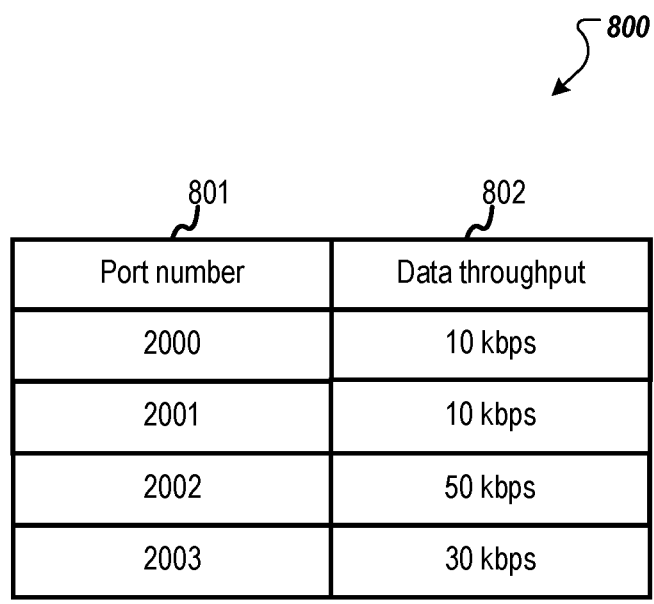
FIG. 8 illustrates a real-time analytics output information table, in accordance with an example implementation.

FIG. 8 illustrates a real-time analytics output information table 800, in accordance with an example implementation. Specifically, column 801 identifies an output port number. Column 802 illustrates a data throughput for the output data of a real-time analytics process by output port number identified in column 801. For example, output port number 2000 is configured for 10 kilobytes per second of throughput.

Figure 9:
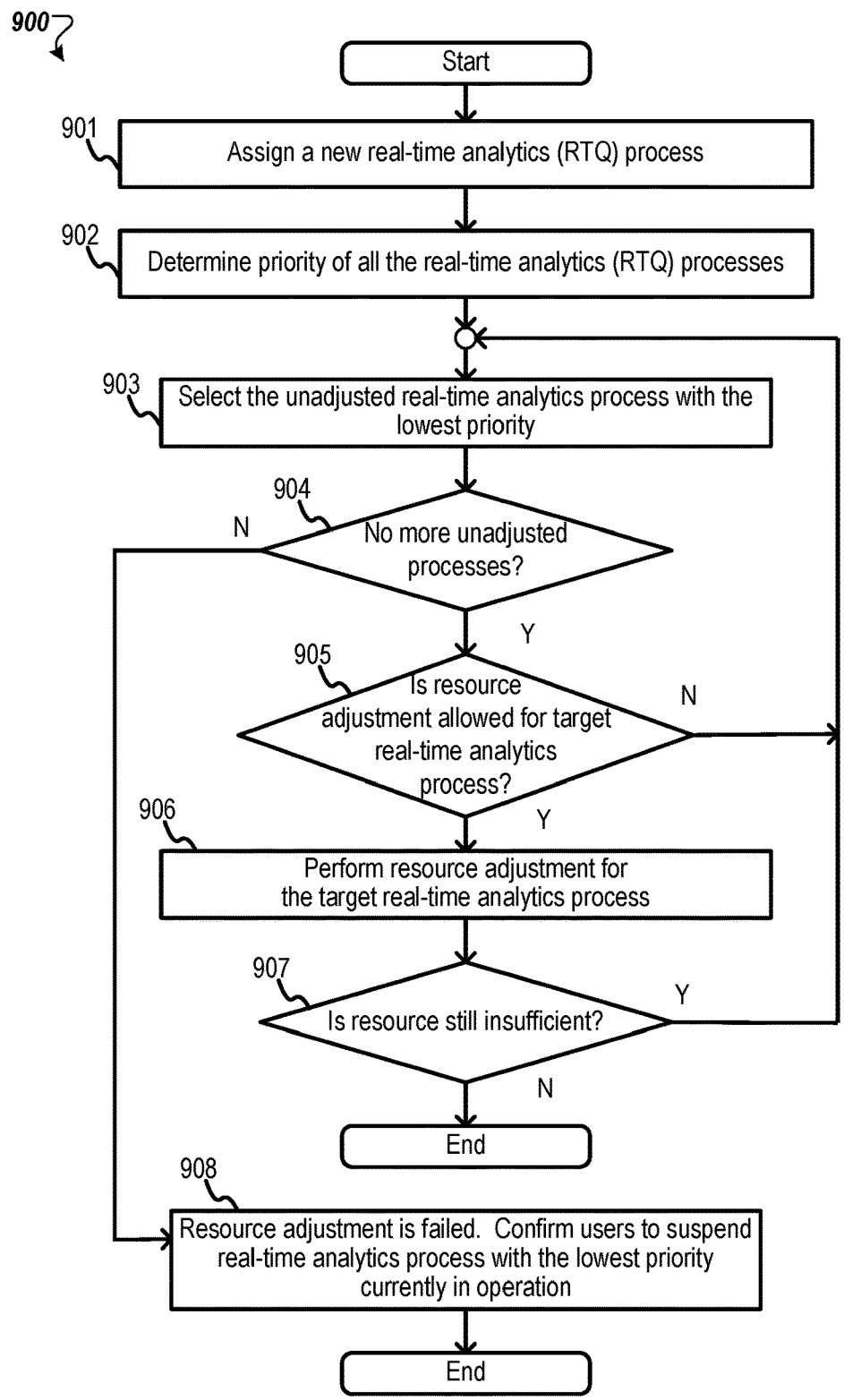
FIG. 9 illustrates a flow of resource adjustment for real-time analytics processes, in accordance with an example implementation.

FIG. 9 illustrates a flow 900 of resource adjustment for real-time analytics processes, in accordance with an example implementation. In an example implementation, flow 900 of resource adjustment is for real-time analytics processes, which is done by the manager MNG (e.g., MNG 117 or MNG 127 of FIG. 1). The manager is controlled by the central manager (CMNG) 137 in the core 130. Based on a user's operation, a new real-time analytics process is registered on the manager. In an implementation, real-time analytics process can be automatically registered by the result of core analytics if authorized by the user. CMNG 137 distributes a real-time analytics program onto the edges (i.e. zone controller 110 or site controller 120) through their manager (MNG 117 or MNG 127). MNG 117, 127 executes the flow 900 illustrated in FIG. 9. At 901, MNG 117, 127 assign the distributed real-time analytics process (RTQ) (e.g., RTQ 221-223 of FIG. 2) in a job queue. At 902, MNG determines a priority of each of the real-time analytics processes assigned and running. For example, the MNG can determine the priority using priority information pre-defined for real-time analytics processes. In another example, data real-time analytics processes generate is utilized to determine priority information of the applications.

FIG. 10 illustrates a flow 1000 for priority determination of real-time analytics processes, in accordance with an example implementation. The flow 1000 is for determining the priority based on the priority of the applications connected to the real-time analytics processes. Starting at 1001, a real-time analytics process is selected, and at 1002 output port numbers that are used by the selected real-time analytics process are obtained from real-time analytics process information, for example, as described in table 400 of FIG. 4. Then at 1003, the application that uses one of the output port numbers is specified based on an application information table, for example, as described in table 500 of FIG. 5. At 1004, the process ID and the application priority of the application is obtained from the application information table (i.e., table 500 of FIG. 5). In an implementation, the application priority can be obtained from priority information by the process ID associated with an operating system. If there exist multiple output ports, for example when multiple applications are using the data generated by that real-time analytics process, the flow at 1005 iterates the steps 1003 and 1004 to determine priority for each of the applications. And then, at 1006 the priority of the target real-time analytics process is determined by using the obtained application priority. If there multiple applications are using the output data of the target real-time analytics process, the application with the highest priority is used. Then, if there exist other real-time analytics processes that are not specified with a priority, the flow at 1007 iterates the steps 1001, 1002, 1003, 1004, 1005, 1006 until each of the real-time analytics processes are determined with a priority.

Returning to FIG. 9, after the priorities of each of the real-time analytics processes are determined; at 903 the unadjusted real-time analytics process with the lowest priority is selected. At 904, if there are no additional unadjusted processes, then resource adjustment has failed. In this case, the resources are insufficient to execute the assigned real-time analytics process with the lowest priority; therefore at 908 a user is notified to confirm that real-time analytics process with the lowest priority is to be cancelled. Otherwise, a user is notified that the newly assigned real-time analytics process is to be cancelled.

When unadjusted processes exist at 904, the flow proceeds to 905 to check if resource adjustment allowed for the target real-time analytics process. If resource adjustments are not allowed, the flow repeats steps 903 to select the unadjusted real-time analytics process with the next lowest priority and iterate the steps 904 and 905. If resource adjustments are allowed for the target real-time analytics process at 905, the flow proceeds to 906 to perform resource adjustment (i.e. memory adjustment for the target real-time analytics process), as described, for example in FIGS. 11-13.

The example implementations herein can involve three methods of memory adjustment:

(1) Memory adjustment by comparing with time resolution defined in CQL and actual sensor rate as described in FIG. 11.

(2) Memory adjustment by updating window size of real-time analytics process according to portion of throughput of output data as described in FIG. 12.

(3) Memory adjustment by updating window size of real-time analytics process according to portion of throughput of output data over throughput of input sensor streams as described in FIG. 13.

After performing resource adjustment for the target real-time analytics process at 906, the flow proceeds to 907 to check if the resources are still insufficient. If the resources are still insufficient, the flow returns to 903 to select the unadjusted real-time analytics process with the next lowest priority and iterate the steps 904-907. If the resources are sufficient at 907, then the adjustment process is complete.

(1) Memory Adjustment by Comparing with Time Resolution Defined in CQL and Actual Sensor Rate FIG. 11 illustrates a flow 1100 of memory adjustment, in accordance with an example implementation. There may exist a mismatch between time resolution defined in real-time analytics program or CQL (continuous query language) and the actual connected sensor data. Streaming data processing preserves memory according to window size and time resolution of data arrival defined in CQL. Therefore, if the actual sensor data rate is less than the time resolution in CQL, then the memory is wasted.

Specifically, flow 1100 describes memory adjustment steps by comparing with time resolution defined in CQL and actual sensor rate. Starting at 1101, data rate information of sensors connected to target real-time analytics process is obtained from sensor information table defined in FIG. 7. If multiple sensors are connected to the target real-time analytics process, at 1102 the sensor with the maximum data rate is selected. At 1103, time resolution information is obtained from the real-time process resource information table defined in FIG. 6 or CQL for the target real-time analytics process. At 1104, the sensor data rate is compared with the time resolution defined in CQL. For example, if at 1104 the sensor data rate is less than time resolution in CQL, the stream data processing is preserving excessive memory even though sensor data may not be arriving at that rate (i.e. a rate that utilizes the allocated memory). Therefore, at 1105, the time resolution of CQL of target real-time analytics process is adjusted according to sensor data date.

For example, if the memory size for a controller is limited to 1 GB and RTQ3 is to be assigned in addition to RTQ1 and RTQ2, RTQ1 and RTQ2 are already assigned 600 MB memory out of the 1 GB consumed, and RTQ needs an additional 500 MB. Then there will be a 100 MB shortage. In the way to adjust memory described, firstly the priority of real-time analytics processes (RTQ) is to be determined. Looking at output port number of RTQ defined in FIG. 4 and data port number for applications (APP) defined in FIG. 5, RTQ3 is identified as the highest priority (0.0, lower is higher), and both RTQ1 and RTQ2 have the second priority (0.2). Therefore optimization can be applied to RTQ1 and RTQ2. In the example depicted in FIG. 4, each of the RTQs are flagged as authorized for optimization.

In FIG. 7 Sensor 1 generates data at the rate of 2 TPS (i.e. two points of data generated every second). Sensor 1 data is processed by RTQ1, which can be determined based on the sensor port number 1000 specified in table 700 of FIG. 7 and the real-time analytics input data port number 1000 associated with RTQ1 is specified in table 400 of FIG. 4. Sensor 2 data with the rate of 0.5 TPS is also processed by RTQ1. By referring to RTQ1's data processing resolution specified in table 600 of FIG. 6, the resolution can be determined to be 0.2 which indicates five data points are to be processed every second. However, in this example, Sensor 1 and Sensor 2 generate 2 and 0.5 points of data every second respectively and RTQ1 is not utilizing the allocated memory. Therefore, RTQ1's resolution can be reduced to 0.5 sec to free up allocated memory that can be made available to other processes. For example:

RTQ1's memory usage is 300 MB, and it can be reduced to (300 [MB]*(0.2 [TPS]/0.5 [TPS]))=20 [MB]. Therefore the memory of 180 [MB] can be freed up, and RTQ3 with the higher priority can be assigned to the controller.

(2) Memory Adjustment According to Portion of Throughput of Output Data

FIG. 12 illustrates a flow 1200 of memory adjustment, in accordance with another example implementation. Flow 1200 is to reduce window size of each of the real-time analytics where reduction is allowed. The amount of reduction is determined by how much data is generated in a unit of time (or throughput) by real-time analytics processes. This means the higher the output throughput is, the less impact on the reduction. The impact of the reduction means decreasing precision of analytics (e.g. first looking at data for a recent 20 second period and then looking at data for a recent 18 second period).

FIG. 12 describes memory adjustment by updating window size of real-time analytics process according to a portion of throughput of output streams. At 1201, output data throughput information is obtained for each of the real-time analytics processes of which adjustment is allowed. For example, whether adjustment is allowed can be determined based on the real-time analytics output information table 800 described in FIG. 8. At 1202, memory reduction size is calculated based on current usage of output data throughput over the total throughput usage as follows.

Memory reduction size=(Estimated memory usage−maximum memory size available)*(Used throughput for target real-time analytics process/Total throughput)

At 1203, time resolution information is obtained from the real-time process resource information table, for example, table 600 of FIG. 6 or CQL. According to the calculated reduction size, time resolution or window size is adjusted at 12014 for the target real-time analytics so that the memory size is reduced by the calculated reduction size.

For example, the input throughputs for all the real-time analytics process RTQ1, RTQ2 and RTQ3 can be defined as 2.5 (combined of sensor 1 and 2 throughput), 10, 0.5 TPS respectively. Therefore, memory reduction size for RTQ1 is calculated as:

((300+300+500) [MB]−1,000 [MB])*(2.5 [TPS]/(2.5+10+0.5)[TPS])=19.2 MB.

In the same way, for RTQ2, and RTQ3 memory reduction sizes for each RTQ are calculated as:

((300+300+500) [MB]−1,000 [MB])*(10 [TPS]/(2.5+10+0.5) [TPS])=76.9 MB.

((300+300+500) [MB]−1,000 [MB])*(0.5 [TPS]/(2.5+10+0.5) [TPS])=3.9 MB.

Then the window size may be reduced based on the portion of memory reduction for each RTQ. For RTQ1, and a new window size can be set as:

10 [min]*(1−19.2 [MB]/300 [MB])=9.36 [min].

In the same way for RTQ2 and RTQ3, the new window sizes be set as

1 [min]*(1−76.9 [MB]/300 [MB])=0.74 [min].

10 [sec]*(1−3.9 [MB]/500 [MB])=9.92 [sec].

(3) Memory Adjustment According to Portion of Throughput of Output Data Over Throughput of Input Sensor Streams FIG. 13 illustrates a flow 1300 of memory adjustment, in accordance with another example implementation. Flow 1300 is also to reduce window size of all the real-time analytics with reduction allowed. The amount to reduce the window size is determined as a portion of throughput of output data over throughput of the input sensor stream. For example, the higher the output throughput is against the input throughput, the less impact on the reduction. In flow 1300, if throughput of a sensor data stream is high and throughput of output data remains high, then the calculation may be determined as a streaming type. Therefore, window size or time resolution can be reduced according to a portion of throughput of output data over throughput of input sensor streams. In flow 1200 of method (2), if throughput of a sensor data stream is high and throughput of output data remains high, then the calculation may be determined as a decision type such as thresholding or alerting.

FIG. 13 describes memory adjustment by updating window size of real-time analytics process according to a portion of throughput of output streams. At 1301, output data throughput information is obtained for the target real-time analytics processes from the real-time analytics output information table, for example, as described in table 800 of FIG. 8. At 1302, input data rate information of target real-time analytics process is obtained from a sensor information table, for example, as described in table 700 of FIG. 7. If there exist multiple input sensors connected, a total data rate of all input data can be accumulated. At 1303, memory reduction size is calculated based on the ratio of accumulated output throughput over accumulated input through put. For example:

Memory Reduction Size=(Estimated memory usage−maximum memory size available)*[(output data throughput/input data rate)/Σ(output data throughput/input data rate) for all processes of which reduction allowed]

(Used throughput for target real-time analytics process/Total throughput)

Then time resolution information real-time process resource information is obtained from a table, for example, as described in table 600 of FIG. 6 or CQL. Time resolution or window size for the target real-time analytics is adjusted in order to reduce the memory size according to the calculated reduction size.

For example, the output throughputs for all the real-time analytics process, RTQ1, RTQ2 and RTQ3 can be determined to be 20 (e.g., by combining APP1 and APP2 throughput), 50, 30 TPS respectively. Therefore, the memory reduction size for RTQ1 is calculated as:

((300+300+500) [MB]−1,000 [MB])*((20 [kbps]/2.5 [TPS])/((20/2.5)+(50/10)+(30/0.5)))=10.9 MB.

The reduction size for RTQ2 and RTQ3 may also be calculated as:

((300+300+500) [MB]−1,000 [MB])*((50 [kbps]/10 [TPS])/((20/2.5)+(50/10)+(30/0.5)))=6.8 MB.

((300+300+500) [MB]−1,000 [MB])*((30 [kbps]/0.5 [TPS])/((20/2.5)+(50/10)+(30/0.5)))=82.2 MB.

Then the window size is reduced based on the portion of memory reduction for each RTQ. For RTQ1, new window size may be set as:

10 [min]*(1−10.9 [MB]/300 [MB])=9.63 [min].

In the same way for RTQ2 and RTQ3, the new window sizes may be set as:

1 [min]*(1−6.8 [MB]/300 [MB])=0.97 [min].

10 [sec]*(1−82.2 [MB]/300 [MB])=0.83 [sec].

For the selection of the above three methods (1), (2) and (3), (1) can be applied first in order to avoid no impact on analytics processing itself (i.e. precision). However (2) and (3) may have impacts on the analytics processing because window sizes may be changed. In an implementation, (2) and (3) are selectable by users.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "determining," "selecting," "applying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A computer system comprising:
a memory configured to manage a relationship between a plurality of real-time analysis processes and a plurality of applications, wherein each of the plurality of applications are configured to utilize output from one or more of the corresponding plurality of real-time analysis processes; and
a processor, configured to:
determine a priority for each of the real-time analysis processes based the relationship in the memory;
select a real-time analysis process from the plurality of real-time analysis processes for computation resource adjustment based on the priority; and
apply the computation resource adjustment to the selected real-time analysis process and reduce the computation resources allocated to the selected real-time analysis,
wherein to apply the computation resource adjustment to the selected real-time analysis process, the processor is further configured to:
obtain output data throughput information for each of the real-time analysis processes that are adjustable, wherein each of the real-time analysis processes is determined to be adjustable based on a flag in the memory;
calculate a memory reduction size;
obtain time resolution information from CQL (continuous query language) of the selected real-time analysis process, wherein time resolution information includes a time resolution or window size of the selected real-time analysis process, and required memory for each CQL;
adjust the time resolution or window size of the selected real-time analysis process so that memory size allocated to the selected real-time analysis process is reduced based on the calculated memory reduction size; and
based on reducing the memory size allocated to the selected real-time analysis process, free up and allocate computation resources to another real-time analysis process, of the plurality of real-time analysis processes, having a higher priority than the selected real-time analysis process, wherein the memory reduction size is calculated based on a current usage of output data throughput divided by the total throughput usage multiplied by the difference between an estimated memory usage and a maximum memory size available.

2. The computer system of claim 1, wherein to determine the priority for each of the real-time analysis processes, the processor is further configured to:
   determine one or more applications associated with a target real-time analytics process based on the relationship in the memory, wherein the relationship in the memory specifies a relationship between each of the plurality of applications, an application priority and one or more output port numbers; and
   determine the priority of the target real-time analytics process based on the highest priority of the one or more applications associated with the target real-time analytics process.

3. The computer system of claim 2, wherein to determine one or more applications associated with the target real-time analytics process, the processor is further configured to:
   obtain one or more output port numbers associated with the target real-time analytics process, wherein each target real-time analytics process is associated with one or more output port numbers, wherein each of the one or more output port numbers is associated with at least one application of the plurality of applications; and
   determine the one or more applications associated with each of the one or more output port numbers.

4. The computer system of claim 1, wherein to apply the computation resource adjustment to the selected real-time analysis process, the processor is further configured to:
   obtain data rate information associated with one or more sensors connected to the real-time analysis process;
   identify the sensor with a maximum throughput based on the obtained data rate information; and
   adjust the time resolution of the CQL for the selected real-time analysis process based on the sensor data rate.

5. The computer system of claim 4, wherein the processor is configured to adjust the time resolution of the CQL for the selected real-time analysis process based on the sensor data rate from a determination that the sensor data rate is less than the time resolution defined in the CQL.

6. A computer system comprising:
   a memory configured to manage a relationship between a plurality of real-time analysis processes and a plurality of applications, wherein each of the plurality of applications are configured to utilize output from one or more of the corresponding plurality of real-time analysis processes; and
   a processor, configured to:
      determine a priority for each of the real-time analysis processes based the relationship in the memory;
      select a real-time analysis process from the plurality of real-time analysis processes for computation resource adjustment based on the priority; and
      apply the computation resource adjustment to the selected real-time analysis process and reduce the computation resources allocated to the selected real-time analysis,
      wherein to apply the computation resource adjustment to the selected real-time analysis process, the processor is further configured to:
         obtain output data throughput information of the selected real-time analysis process;
         obtain sensor input data throughput information of the one or more sensors;
         calculate a memory reduction size; and
         adjust the selected real-time analysis process based on the calculated memory reduction size,
      wherein to reduce the computation resources allocated to the selected real-time analysis, the processor is configured to:
         reduce the computation resources allocated to the selected real-time analysis based on said adjusting of the selected real-time analysis process, and
         based on reducing the computation resources, free up and allocate computation resources to another real-time analysis process, of the plurality of real-time analysis processes, having a higher priority than the selected real-time analysis process, and
      wherein to calculate the memory reduction size, the processor is configured to:
         determine a selected reduction ratio for the selected real-time analysis process, wherein the selected reduction ratio is the output data throughput divided by an input data rate for the selected real-time analysis process;
         determine a total reduction ratio, wherein the total reduction ratio is a sum of reduction ratios for each real-time analytic processes of which reduction allowed, where the reduction ratio is the output data throughput divided by an input data rate for each real-time analytic processes of which reduction allowed;
         calculate the memory reduction size based on the selected reduction ratio divided by the total reduction ratio multiplied by multiplied by the difference between an estimated memory usage and a maximum memory size available.

7. A non-transitory computer readable medium, storing instructions for managing a relationship between a plurality of real-time analysis processes and a plurality of applications, wherein each of the plurality of applications are configured to utilize output from one or more of the corresponding plurality of real-time analysis processes, the instructions comprising:
   determining a priority for each of the real-time analysis processes based the relationship in a memory;
   selecting a real-time analysis process from the plurality of real-time analysis processes for computation resource adjustment based on the priority;
   obtaining output data throughput information for each of the real-time analysis processes that are adjustable, wherein each of the real-time analysis processes is determined to be adjustable based on a flag in the memory;
   calculating a memory reduction size;
   obtaining time resolution information from CQL (continuous query language) of the selected real-time analysis process, wherein time resolution information includes a time resolution or window size of the selected real-time analysis process, and required memory for each CQL; and
   adjusting the time resolution or window size of the selected real-time analysis process so that the memory size the selected real-time analysis process is reduced based on the calculated memory reduction size, wherein the memory reduction size is calculated based on a current usage of output data throughput divided by the total throughput usage multiplied by the difference between an estimated memory usage and a maximum memory size available;

applying the computation resource adjustment to the selected real-time analysis process and reducing the computation resources allocated to the selected real-time analysis; and based on reducing the memory size allocated to the selected real-time analysis process, freeing up and allocating computation resources to another real-time analysis process, of the plurality of real-time analysis processes, having a higher priority than the selected real-time analysis process.

8. The non-transitory computer readable medium of claim 7, the instructions further comprising:

determining one or more applications associated with a target real-time analytics process based on the relationship in the memory, wherein the relationship in the memory specifies a relationship between each of the plurality of applications, an application priority and one or more output port numbers; and determining the priority of the target real-time analytics process based on the highest priority of the one or more applications associated with the target real-time analytics process.

9. The non-transitory computer readable medium of claim 7, the instructions further comprising:

obtaining one or more output port numbers associated with the selected real-time analytics process, wherein each target real-time analytics process is associated with one or more output port numbers, wherein each of the one or more output port numbers is associated with at least one application of the plurality of applications; and determining the one or more applications associated with each of the one or more output port numbers.

10. The non-transitory computer readable medium of claim 7, the instructions further comprising:

obtaining data rate information associated with one or more sensors connected to the real time analysis process;

identifying the sensor with a maximum throughput based on the data rate information; and adjusting the time resolution of the CQL for the selected real-time analysis process based on the data rate of the identified sensor.

11. A non-transitory computer readable medium, storing instructions for managing a relationship between a plurality of real-time analysis processes and a plurality of applications, wherein each of the plurality of applications are configured to utilize output from one or more of the corresponding plurality of real-time analysis processes, the instructions comprising:

determining a priority for each of the real-time analysis processes based the relationship in a memory;

selecting a real-time analysis process from the plurality of real-time analysis processes for computation resource adjustment based on the priority;

obtaining output data throughput information of the selected real-time analysis process;

obtaining sensor input data throughput information of the one or more sensors;

calculating a memory reduction size; and adjusting the selected real-time analysis process based on the calculated memory reduction size; and applying the computation resource adjustment to the selected real-time analysis process and reducing the computation resources allocated to the selected real-time analysis, wherein calculating the memory reduction size comprises:

determining a selected reduction ratio for the selected real-time analysis process, wherein the selected reduction ratio is the output data throughput divided by an input data rate for the selected real-time analysis process;

determining a total reduction ratio, wherein the total reduction ratio is a sum of reduction ratios for each real-time analytic processes of which reduction allowed, where the reduction ratio is the output data throughput divided by an input data rate for each real-time analytic processes of which reduction allowed; and calculating the memory reduction size based on the selected reduction ratio divided by the total reduction ratio multiplied by multiplied by the difference between an estimated memory usage and a maximum memory size available, and wherein reducing the computation resources allocated to the selected real-time analysis comprises:

reducing the computation resources allocated to the selected real-time analysis based on said adjusting of the selected real-time analysis process, and based on reducing the computation resources, freeing up and allocating computation resources to another real-time analysis process, of the plurality of real-time analysis processes, having a higher priority than the selected real-time analysis process.

* * * * *